Patented Mar. 3, 1931

1,795,200

UNITED STATES PATENT OFFICE

PERCY BROADBENT CROSSLEY, OF CHISWICK, LONDON, ENGLAND, ASSIGNOR TO MYCALEX (PARENT) COMPANY, LIMITED, OF LONDON, ENGLAND, A COMPANY OF GREAT BRITAIN

MANUFACTURE OF VITREOUS MATERIAL

No Drawing. Application filed May 19, 1930, Serial No. 453,852, and in Great Britain February 8, 1929.

It is known that mica or asbestos can be mixed by a fusion process with glasses which are sufficiently fluid at suitable temperatures to form products having advantageous properties more particularly a capacity for being moulded at a high temperature so that they constitute plastic vitreous materials.

As a result of considerable experiment I have ascertained that if in the manufacture of a product of this kind both mica and asbestos are used together in a suitable state of very fine subdivision up to and including of colloidal fineness, dispersions are readily obtained at lower temperatures and with less chemically reactive agents thus mica dust appears almost soluble at a low heat say below 700° C. in lead borate, but is only soluble with difficulty in lead silicate at the same temperature level, whereas if both mica and asbestos be present and are in a fine state of subdivision and are admixed with powdered silicates then the materials so compounded fuse in a like manner to the lead borate previously described and at about the same temperature, and the product with either lead borate or lead silicate present has a considerably greater strength than when mica only or asbestos only is used. Furthermore, mixtures compounded in accordance with the present invention are readily compressible in the cold condition to a density comparable with known products moulded at a high temperature, thus articles can be made ready for the market by a more simple and cheaper process than hitherto.

This unexpected result considerably enhances the value of the product for many purposes and makes it suitable for new purposes. Furthermore, it is possible to employ in the composition other relatively infusible materials such as soda glass or porcelain waste, thus cheapening it, and/or other refractories as for example oxide of zirconium for the purpose of modifying the heat resisting properties to suit various trade requirements.

In carrying this invention into effect, and in the preferred manner, the raw materials to be employed as additions to the mica and asbestos mixtures naturally divide themselves into two generic groups or categories as under:—

(1) Relatively refractory materials each possessing some characteristic and desirable quality.

(2) Relatively fusible materials employed under heat conditions to bring the materials of (1) into fusion or heat solution so that a homogeneous compound is produced, the heat of solution being insufficient to destroy the innate qualities of the refractory bodies.

The relatively refractory raw materials under (1) may be as follows:—Ceramic compounds such as porcelain, soda lime glass and crystal glass, i. e. lead glass.

All these materials are infusible below a temperature of 900 deg. C.

For the purpose of the invention, they are employed in combination with the mica asbestos mixture. The preferred proportions by weight are 50% of (1) with 25% of mica, and 25% of asbestos. For the purpose of the invention, the term mica includes kindred silicates of laminated structure, and the term asbestos includes kindred silicates of fibrous structure.

These raw materials are comminuted and a proportion of each reduced by any convenient and known means, preferably in a colloidal mill, to a finely disintegrated or colloidal condition, and in such condition are ready for compounding.

The relatively fusible raw materials to be employed under (2) may be stated as under:—

(2) Fluxes, glazes, or vitreous enamels or the constituent materials which on fusion form these substances. The preferred compositions are:—(a) Lead salts, lead borates and boro silicates or kindred bodies essentially containing the oxides of lead and/or boron. These salts or compounds may be alkaline in nature and include: (b) the compound borates in which the lead oxide has been partly displaced by oxides of other metals such as zinc or bismuth.

All these materials are fusible below 700 deg. centigrade. A typical compounding under (2) is as under:—

Litharge _____ 5 parts.
    Boric acid _____ 2 parts.
    Both in powdered form.

These ingredients after grinding so that part of the material is in a colloidal state of sub-division, are directly mixed with the preceding mixture containing mica and asbestos, or they may be first heated after mixing to a temperature of 360 deg. to 400 deg. C. to drive off the volatiles (chiefly the water of crystallization) and the product rendered insoluble in water. The compound formed on heating is then powdered, and a proportion thereof reduced to a colloidal state of fineness before the admixture takes place with the preceding mixture.

The mixture of (2) may be alternatively prepared by allowing it to fall in a fine continuous stream, which is controlled in any suitable manner on to an inclined heated metal plate, the latter having a temperature maintained of 1100 deg. to 1200 deg. C. This stream of finely divided material instantly melts to a clear glaze runs down the inclined plate and falls into a collecting bath of water, where it disintegrates. It is then ground in a suitable machine such as a ball mill before being used in the mixture, a portion being in a colloidal state.

Having prepared the ingredients for mixing the operation of the invention proceeds as follows: Sixty per cent by weight of materials under (1) admixed with the mica asbestos mixture are compounded with forty per cent of materials under (2). It will be understood that although the above proportions are stated as constituting a good and practical working example, the scope of the invention is not necessarily limited to the exact proportions before stated. They may be varied within wide limits without departing from the nature and spirit of the invention. In mixing these materials a mill is employed of known pattern, or alternatively the mixing may be done during the grinding operation.

After mixing in a dry condition for a sufficient length of time to produce a mass as homogeneous as possible a small proportion of liquid is introduced, say 3 to 10% by weight the object being to increase the moulding or plastic qualities and give a product which is sufficiently cohesive in a cold condition. The liquid employed may be water or a decinormal solution of caustic alkali with water.

To obtain a material which will give an extremely faithful replica of the mould, even down to fine lettering, at least 10% of the total mixture by weight should be of colloidal fineness.

The further treatment may be divided into two parts, namely, cold pressing, and vitrification. The moulds for the cold pressing are of any suitable known type, and the material as above in its moist condition is inserted into the mould, the mould closed and pressure up to 5 tons per square inch applied. With this pressure the moulded material retains its form and is then vitrified. The material in its prepared state for cold moulding is a merchantable commodity and may be treated in most types of moulding presses and muffle furnaces for subsequent vitrification. The pressure varies inversely to the content of colloidal substances present in the mixture. When the mass contains over 30% of material in the colloidal state it may be slip-cast preferably into porous moulds.

Vitrification of the moulded articles preferably takes place at a temperature below 750° C. in an oxidizing atmosphere, and for a time dependent upon the size and nature of the article, upon the nature of the composition used and on the degree of vitrification required. Furnaces used are preferably of the continuous feed type such as the muffle lehrs used in the glass industry.

In order to render certain moulded articles extremely heat resisting (and this applies particularly in the manufacture of arc-shields and similar applications) zirconium oxide or an allied high refractory body may be incorporated in or applied to the surface of the moulded article.

As an alternative to the above procedure the mixture prepared as above may be cold pressed into blanks which are heated to a sufficiently high temperature to render the mass plastic and suitable for hot moulding. The hot plastic mass obtained from heating a cold blank may be heat pressed in any known manner, moulded, stamped or extruded.

The moulds employed for hot pressing are preferably made from alloy steels, the interior faces of the moulds being plated with chromium. The moulds are preferably heated to a working temperature by placing them between heated plates on the press; the press platens can be heated in any known manner such as by gas, electric current or other convenient means.

By adding suitable coloured oxides such as the oxides of iron, chromium, cobalt or manganese to the fusible raw materials or to the mixture whilst it is in the mixing mill coloured products are obtainable, and opalizing agents such as tin oxide or suitable fluorides may also be employed.

Again, the articles having assumed their final shape by cold or hot pressing may be glazed or enamelled by dipping or spraying and then vitrified.

The finished product obtained by the foregoing methods of production is extremely tough, has high electrical insulating properties, and if punctured by high tension discharge is self-sealing. Owing to its good properties in respect of being worked and its toughness and again its low cost of production, the material is applicable to a number of uses for which ordinary vitreous materials are quite inapplicable. For example, it may be used for making moving machine parts, sparking plugs, electric resistance elements and domestic fittings in addition to electrical insulators for which latter purpose its inherent qualities render it preeminently suitable.

I claim:—

1. The process of making a plastic composition which comprises mixing colloidal mica, colloidal asbestos, refractory ceramic material infusible below 900° C. and metallic flux material fusible below 700° C., and molding the mixture.

2. The process of making a plastic composition which comprises molding a mixture containing colloidal mica, colloidal asbestos, refractory ceramic material infusible below 900° C., flux material fusible below 700° C., and then vitrifying the molded mass at a temperature below 750° C.

3. The process of preparing a plastic vitreous material having high insulating properties which comprises mixing mica and asbestos each reduced to a colloidal condition with finely divided porcelain waste substantially infusible below 900° C. and finely divided lead flux substantially fusible below 700° C., cold pressing the mixture, and then vitrifying the same.

4. The process of making a plastic composition which comprises preparing a finely divided mixture of mica, asbestos and refractory ceramic material and vitrifying the mixture with a flux melting sufficiently low to avoid damage to the mica or asbestos.

5. The process of utilizing refractory vitreous material such as waste porcelain in a plastic composition which comprises mixing the refractory material with mica and asbestos, a substantial portion of said mica and asbestos being in colloidal condition, and vitrifying the mass with a flux which is fusible below 700° C.

6. The process of dissolving and dispersing laminated and fibrous silicates in a vitreous flux fusible below 700° C. to form a plastic vitreous composition which comprises reducing said silicates to such a fine state of subdivision that a substantial part of each will be in colloidal condition, admixing the same with the said flux, and vitrifying the mass.

7. A vitreous plastic composition comprising colloidal mica and colloidal asbestos dispersed uniformly through a fusible flux containing lead, said flux having a fusing point below 700° C.

8. A plastic composition comprising colloidal mica, colloidal asbestos, and refractory ceramic material homogeneously dispersed throughout a flux having a fusing point below 700° C.

9. A composition of the class described which is readily compressible in the cold state comprising colloidal mica, colloidal asbestos, porcelain waste, and a flux fusible below 700° C.

10. A vitreous heat resisting plastic composition comprising a homogeneous dispersion in a flux material fusible below 700° C. of colloidal mica, colloidal asbestos, refractory ceramic material infusible below 900° C., and a highly refractory oxide.

11. The process of homogeneously dissolving and dispersing a ceramic material substantially infusible below 900° C. in a vitreous flux substantially fusible below 700° C. which comprises admixing said ceramic material with said flux together with a substantial proportion of colloidal mica and colloidal asbestos, and molding and vitrifying the mass.

In testimony whereof I have hereunto set my hand.

PERCY BROADBENT CROSSLEY.